(12) United States Patent
Rizos

(10) Patent No.: US 11,414,348 B2
(45) Date of Patent: Aug. 16, 2022

(54) HIGH STRENGTH REDUCED ELASTIC MODULUS CONCRETE

(71) Applicant: University of South Carolina, Columbia, SC (US)

(72) Inventor: Dimitris Rizos, Columbia, SC (US)

(73) Assignee: University of South Carolina, Columbia, SC (US)

(*) Notice: Subject to any disclaimer, the term of this patent is extended or adjusted under 35 U.S.C. 154(b) by 287 days.

(21) Appl. No.: 15/674,645

(22) Filed: Aug. 11, 2017

(65) Prior Publication Data

US 2018/0044237 A1 Feb. 15, 2018

Related U.S. Application Data

(60) Provisional application No. 62/374,965, filed on Aug. 15, 2016.

(51) Int. Cl.
| | | |
|---|---|---|
| *C04B 14/04* | (2006.01) | |
| *C04B 28/08* | (2006.01) | |
| *C04B 28/02* | (2006.01) | |
| *E01B 3/28* | (2006.01) | |
| *C04B 111/00* | (2006.01) | |

(52) U.S. Cl.
CPC ............ *C04B 14/048* (2013.01); *C04B 28/02* (2013.01); *C04B 28/021* (2013.01); *C04B 28/08* (2013.01); *C04B 2111/0075* (2013.01); *C04B 2201/05* (2013.01); *C04B 2201/52* (2013.01); *E01B 3/28* (2013.01); *Y02W 30/91* (2015.05)

(58) Field of Classification Search
CPC ... C04B 14/048; C04B 2201/52; C04B 28/02; C04B 28/021; C04B 28/08; E01B 3/28
See application file for complete search history.

(56) References Cited

U.S. PATENT DOCUMENTS 5,609,295 A * 3/1997 Richards ................... E01B 3/36
238/106
6,786,459 B2   9/2004 Pilesi

FOREIGN PATENT DOCUMENTS

| KR | 800000882 B1 * | 8/1980 |
| KR | 101440551 B1 * | 9/2014 |

OTHER PUBLICATIONS

Investigation of Weathered Granite for Pavement Material in CoastalAreas of Shandong Province to Liu et al.Published online: Jul. 21, 2016.*

(Continued)

*Primary Examiner* — Shuangyi Abu Ali
(74) *Attorney, Agent, or Firm* — Dority & Manning, P.A.

(57) ABSTRACT

Concrete that exhibits increased flexibility (i.e., low modulus of elasticity) and high compressive strength is described. High aspect ratio structures as may be formed of the concrete are described. Structures formed of the concrete can have the same high compressive strength as similar structures formed from a more conventional concrete but can be significantly more flexible, which can allow for better load distribution in the structure and associated assembly. The concrete includes a weathered granite as coarse aggregate. The materials can be particularly beneficial in forming concrete components of a rail infrastructure, such as railroad ties and slabs.

16 Claims, 7 Drawing Sheets

(56) References Cited

OTHER PUBLICATIONS

Jeong, D. and Yu, H. (2012) Overview of FRA/Volpe Research on Concrete Ties, International Concrete Crosstie & Fastening System Symposium, Rail Transportation and Engineering Center, U. of Illinois Urbana-Champaign, Jun. 6-8.

Zeman, J.C., J.R. Edwards, C.P.L. Barkan, D.A. Lange, 2009a, "Failure Mode and Effect Analysis of Concrete Ties in North America," Proc. of the 9th International Heavy Haul Conference, Shanghai, China, June, pp. 270-278.

Petrou, MF, Rizos, DC, Harries, K.A. and Hanson, J. (2004) "Permeability of Portland Cement Concrete (PCC) Structures in South Carolina—vol. II", Department of Civil and Environmental Engineering Report (final report for SCDOT/FHWA) No. ST04-04.

Goodspeed, C.H., Vanikar, S. and Cook, R.A. (1996), "High-performance concrete defined for highway structures", Concrete International, V.18 (2), 1996 pp. 62-67.

ACI 318-02 Building Code Requirements for Structural Concrete (318-02) and Commentary (318R-02), American Concrete Institute, Farmington Hills, Michigan, 2002, 443 pp.

Tilak, U. Venkat, and A. Narender Reddy. "Effect of Different Percentage Replacement of Weathered Aggregate in Place of Normal Aggregate on Young's Modulus of Concrete to Produce High strength and Flexible/Ductile Concrete for use in Railway Concrete Sleepers."

Aitcin, P. and Mehta, P. (1990) "Effect of Coarse-Aggregate Characteristics on Mechanical Properties of High-Strength Concrete", ACI Materials Journal, V.87, pp. 103-107.

Giaccio, G. Rocco, C., Violini, D., Zappitelli, J. and Zerbino, R. (1992) "High Strength Concretes Incorporating Different Coarse Aggregates", ACI Materials Journal, V.89, pp. 242-246.

Rizos, Dimitrios C. "High-Strength Reduced-Modulus High Performance Concrete (HSRM-HPC) for Prestressed Concrete Tie Applications." 2016 Joint Rail Conference. American Society of Mechanical Engineers, 2016.

College of Education—University of Memphis, "High-Performance Concrete", Chapter 17. www.ce.memphis.edu. Internet date Aug. 10, 2017 (16 pages).

* cited by examiner

Aggregate Phase    Mortar Phase    Test Cylinder

HIGH STRENGTH REDUCED ELASTIC MODULUS CONCRETE

CROSS REFERENCE TO RELATED APPLICATION

This application claims filing benefit of U.S. Provisional Patent Application Ser. No. 62/374,965 having a filing date of Aug. 15, 2016, which is incorporated herein by reference for all purposes.

GOVERNMENT SUPPORT CLAUSE

This invention was made with government support under contract no. DTFR5314C00023 awarded by the Federal Railroad Administration. The government has certain rights in the invention.

BACKGROUND

Concrete is the most commonly used man-made construction material in the world. High Performance Concrete (HPC) refers to concrete that has been specifically designed to exceed particular characteristics of more typical concretes. Characteristics in which HPC can excel can include one or more of strength, early strength, modulus of elasticity, abrasion resistance, low permeability, chemical resistance, temperature resistance, impact resistance, etc. Formation of HPC can include use of special materials and/or special mixing, placing, and curing practices to produce and handle the concrete. HPC has been used in tunnels, bridges, tall buildings, shotcrete repair, high aspect ratio structures (e.g., poles), parking garages, and agricultural applications among others.

HPC having high early compressive strength development is one particular type of HPC. High early compressive strength concrete is generally defined as having a compressive strength of about 4 kilo-pounds per square inch (ksi) to about 7 ksi at a cure time of anywhere from a few hours to about 3 days (as determined according to ASTM C 39 (AASHTO T 22)), depending upon the application. High early strength concrete is used for forming prestressed concrete to allow for early stressing; precast concrete for rapid production of elements; high-speed cast-in-place construction; rapid form reuse; cold-weather construction; rapid repair of pavements to reduce traffic downtime; fast-track paving; and several other uses.

One particularly exciting possibility for high early strength concrete is in the replacement of wooden railroad ties. Concrete railroad ties having a design life over 50 years could have a number of strong environmental and economic benefits as well as improved performance characteristics over traditional wooden ties. Unfortunately, concrete ties may not reach their design life due to a number of performance issues related to rail seat deterioration, shoulder/fastener wear or fatigue, cracking from center binding, or other causes that lead to stress concentrations. The development of high amplitude stresses and the corresponding stress distribution within the tie appears to be a common underlying cause for most of the critical issues that affect tie performance. In turn, the high stresses and stress distribution are directly related to a combination of the strength and the stiffness of the tie, which depend on the strength and elastic modulus of the materials for a given concrete tie geometry. The higher strength of HPCs in general has been directly correlated to higher values of elastic modulus. As a consequence, the combination of increased strength with high rigidity and brittleness may lead to premature cracking and deterioration of concrete ties. Although some problems can be alleviated through the use of steel or other fibers or other additives in the mix, this type of remediation significantly impacts the fabrication procedures and comes at a high fabrication cost.

What is needed in the art is high strength concrete, and in particular a high early compressive strength concrete, that can exhibit increased flexibility, i.e., decreased elastic modulus. Such a material would be particularly beneficial in high aspect ratio prestressed constructs, such as railroad ties or other components of rail infrastructure. Such a high strength and relatively flexible load bearing element can result in more regularized (smoother) stress field gradients with reduced amplitudes that could alleviate issues associated with high stresses as are found in many concrete structures.

SUMMARY

According to one embodiment, disclosed is a high early strength concrete that exhibits high flexibility. For instance, the high early strength concrete can have a 3-day compressive strength of about 7.0 ksi or greater as determined according to ASTM C 39 (AASHTO T 22) and an elastic modulus of about 4,500 ksi or less as determined according to ASTM C 469.

Also disclosed is a concrete structure having an aspect ratio of greater than 1 formed from a concrete having a compressive strength of about 7.0 ksi or greater as determined according to ASTM C 39 (AASHTO T 22) and an elastic modulus of about 4,500 ksi or less as determined according to ASTM C 469. In one particular embodiment, the high aspect ratio structure is a component of a rail infrastructure, for instance a railroad tie or a concrete slab.

According to one embodiment, disclosed is a method for forming a high early strength concrete. For instance, a method can include mixing water with dry materials. More specifically, the dry materials can include a coarse aggregate, a fine aggregate, and a binder, and the coarse aggregate can include a weathered granite aggregate.

BRIEF DESCRIPTION OF THE FIGURES

A full and enabling disclosure of the present subject matter, including the best mode thereof, to one of ordinary skill in the art, is set forth more particularly in the remainder of the specification, including reference to the accompanying figures in which.

DETAILED DESCRIPTION

Figure 1:
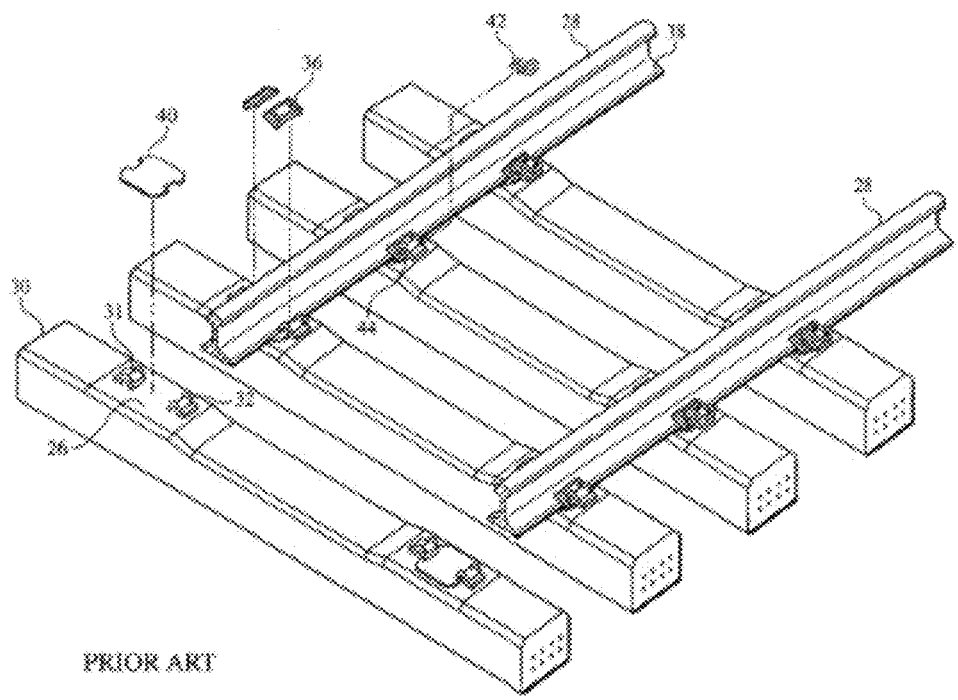
FIG. 1 is a partially exploded perspective view of a concrete railroad tie assembly including a railroad tie as may be formed with a concrete as disclosed herein.

It is to be understood by one of ordinary skill in the art that the present discussion is a description of exemplary embodiments only, and is not intended as limiting the broader aspects of the present disclosure.

In general, disclosed herein is concrete that exhibits increased flexibility (i.e., low modulus of elasticity) without an expected accompanying loss in compressive strength. Also disclosed are structures as may beneficially be formed from the concrete. Typically, concretes exhibiting a low elastic modulus and resultant increase in flexibility will exhibit a loss in compressive strength. In disclosed concretes, however, structures formed of the concrete can have the same high compressive strength as similar structures formed from a more conventional concrete, but can be significantly more flexible, which can allow for better load distribution in the structure and associated assembly.

The disclosed materials can be particularly beneficial in formation of high aspect ratio structures, and in one particular embodiment, in formation of concrete railroad ties. For instance, railroad ties formed of the disclosed materials can pass the American Railway Engineering and Maintenance-of-Way Association (AREMA) strength and product qualification tests. The increased flexibility of railroad ties formed of the concrete can lead to reduced stress amplitudes and regularized stress fields at the rail seat area and the middle segment of the tie, which are the two most critical areas of tie failure.

Through utilization of the concrete, premature cracking in structures due to high stress concentrations can be alleviated. This can be particularly beneficial in high aspect ratio structures. While the elastic modulus can be in some embodiments about 37% to about 50% lower than a typical concrete without negatively affecting the compressive strength, other material properties (e.g., slump, air content, density, tensile strength, etc.) can be unaffected as compared to more typical concrete. Moreover, the resistance to abrasion as determined from lapping tests can be superior compared to conventional concrete.

The disclosed concrete can have a compressive strength as determined according to ASTM C 39 (AASHTO T 22) of about 7 ksi or greater, about 8 ksi or greater, or about 9 ksi or greater in some embodiments. In addition, the concrete can have an elastic modulus as determined according to ASTM C 469 of about 4,500 ksi or less, about 3,500 ksi or less, or about 3,000 ksi or less in some embodiments. For instance, the concrete can have a compressive strength of about 7 ksi or greater and an elastic modulus of about 2,600 ksi or less. In some embodiments, the concrete can have a compressive strength of about 8.5 ksi or greater and an elastic modulus of about 2,900 ksi or less.

As used herein, the term 'concrete' generally refers to a construction material that includes one or more aggregates (which can include a combination of coarse aggregates and fine aggregates) mixed with water, a cementitious binder, and any suitable modifiers. The term 'concrete' encompasses, without limitation, hydratable cementitious compositions including ready-mix or pre-cast concrete, masonry concrete, shotcrete, bituminous concrete, gypsum compositions, cement-based fireproofing compositions, and the like.

In a traditional concrete, the aggregate generally includes a quartz sand, limestone, calcium carbonate, or the like. In the disclosed concrete, at least a portion of the coarse aggregate component is formed of weathered granite. As utilized herein, weathered granite refers to granite that has been at least partially decomposed. Unweathered granite contains sodium plagioclase feldspar (Na feldspar), potassium feldspar (K feldspar), quartz, accessory biotite, amphibole, or muscovite. As the granite is weathered, the Na feldspar and K feldspar undergo hydrolysis to form kaolinite (clay) as well as sodium and potassium ions ($Na^+$ and $K^+$). The quartz (and muscovite if present) remains as residual mineral due to high weathering resistance. The biotite and/or amphibole undergo hydrolysis to form clay as well as oxidation to form iron oxides. Thus, weathered granite can be recognized by the presence of one or more of kaolinite or other clays, sodium ions, potassium ions, and iron oxides.

The weathered granite of the concrete can have a typical size as other, more traditional coarse aggregates, e.g., about 0.19 inches or greater in average largest cross-sectional dimension, or from about 0.4 inches to about 1.5 inches in some embodiments.

While the weathered granite coarse aggregate can be the only coarse aggregate of a concrete, this is not a requirement, and in some embodiments, the weathered granite aggregate can be combined with one or more other, more traditional coarse aggregates. For example, the weathered granite aggregate can form about 50% by weight or more of the total coarse aggregate component, about 60 wt. % or more, about 75 wt. % or more, about 80 wt. % or more, or about 90 wt. % or more of the total coarse aggregate component.

The amount of weathered granite utilized in forming a concrete can be similar to that of more typical coarse aggregate components. For instance, the total coarse aggregate of an as-formed wet concrete (whether formed of only weathered granite or formed of weathered granite in conjunction with one or more other coarse aggregates) can be from about 1700 pounds per cubic yard ($lb/yd^3$) to about 2000 $lb/yd^3$, or from about 1750 $lb/yd^3$ to about 1900 $lb/yd^3$, in some embodiments.

The concrete can include fine aggregate, in conjunction with the coarse aggregate. Fine aggregates generally include natural sand or crushed stone with most particles passing through a ⅜-inch sieve. For instance, the wet as-formed concrete can include fine aggregate in an amount of from about 1120 $lb/yd^3$ to about 1200 $lb/yd^3$, or from about 1140 $lb/yd^3$ to about 1180 $lb/yd^3$, in some embodiments.

The binder of the concrete may be any suitable binder as is known, with a preferred binder generally depending upon the particular application of the concrete. The binder may include, for instance and without limitation, Portland cements including Portland cement blends (e.g., Portland blast-furnace slag cement, Portland fly ash cement, Portland silica fume cement, etc.), magnesium phosphate cement, supersulfated cement, calcium aluminate cement, alkali activate binders, gypsum-based binders, and the like. By way of example, a binder component can include a mixture of two or more of cement (e.g., Portland cement), fly ash, slag, silica fume, and/or other binders as are known in the art. The total binder component can generally be present in the as-formed wet cement in an amount of from about 500 lb/yd$^3$ to about 1000 lb/yd$^3$, for instance from about 600 lb/yd$^3$ to about 900 lb/yd$^3$, in some embodiments.

The amount of water added to the cement can be according to standard practice. For instance, the water can be added to the other components in an amount of from about 200 lb/yd$^3$ to about 250 lb/yd$^3$. For example, the ratio of the water to the cementing materials (by weight) can be from about 0.2 to about 0.8, for instance from about 0.25 to about 0.5 in some embodiments.

The concrete can be formed with additional modifiers as are generally known in the art. For instance, fibers such as glass fibers, steel fibers, natural fibers, and polymeric fibers including polyolefins, polyamides (e.g., nylon), and so forth can be incorporated in the concrete. Fibrous reinforcement materials can include fibers of any suitable size and geometry. By way of example, individual microfibers including a round cross-sectional geometry can be preferred in some embodiments, while larger fibers, fibers of a noncircular cross sectional shape, and/or crimped fibers, as well as fibrous mesh reinforcements can be preferred in other embodiments.

Other admixtures as are known in the art can be included in the concrete. Exemplary admixtures can include, without limitation, set retarding admixtures (e.g., calcium ligno-sulfonates, carbohydrate derivatives, lignin, borax, etc.), air entrainment admixtures (e.g., salts of wood resins (Vinsol resin), some synthetic detergents, salts of sulfonated lignin, salts of petroleum acids, salts of proteinaceous material, fatty and resinous acids and their salts, alkylbenzene sulfonates, salts of sulfonated hydrocarbons), accelerating admixtures (e.g., calcium chloride, salts of nitrate, nitrite, formate or thiocyanate, etc.), shrinkage reducing admixtures (e.g., polyoxyalkylene alkyl ethers, propylene glycol, etc.), water reducing admixtures/plasticizers (e.g., ligno-sulfonates, hydrocarbolic acid salts, etc.), super plasticizers (e.g., sulfonated melamine formaldehyde condensates, sulfonated naphthalene formaldehyde condensates, polycarboxylate ether superplasticizers, etc.), corrosion inhibiting admixtures (calcium nitrites, sodium nitrites, sodium benzoates, ester amines, etc.), fungicides, germicides, pumping aids, etc.

When included, other admixtures can be included in a concrete in standard amounts.

In one embodiment, the concrete can be an early strength concrete. An early strength concrete can achieve a particular compressive strength and relatively low elastic modulus, e.g., about 7.0 ksi strength or greater and about 4,500 ksi or less elastic modulus, as previously discussed, within a relatively short cure time, for instance in about 3 days or less, about 2 days or less, or about 1 day or less in some embodiments. In one embodiment, the early strength concrete can achieve a compressive strength of 4 ksi or greater within 24 hours or less, for instance in a period of from about 12 hours to about 24 hours in some embodiments.

A high early strength concrete can be obtained by use of the weathered granite aggregate in combination with other known materials and methods common for attaining a high early strength concrete. For instance, a high early strength concrete can be obtained by use of a Type III or other typical high early strength cement; by utilizing a relatively high cement/binder content in the mixture (e.g., about 675 lb/yd$^3$ to about 1000 lb/yd$^3$); by use of a relatively low water to cementing materials weight ratio (e.g., about 0.20 to about 0.45); by use of a higher formation temperature and/or a higher curing temperature, for instance at an increased temperature up to about 60° C. (about 140° F.), for instance from about 30° C. to about 60° C. in some embodiments; through inclusion of certain chemical admixtures; by inclusion of silica fume or other supplementary cementing materials in the binder; through insulation to retain the heat of hydration during cure; etc. Higher cure temperature can generally be achieved through steam curing at atmospheric pressure according to standard practice.

In one embodiment, the concrete can be high strength concrete. As utilized herein, a high strength concrete is considered to be a concrete that has a 28-day compressive strength as determined according to ASTM C 39 (AASHTO T 22) of about 7 ksi or greater. In general, a high strength concrete can be obtained through inclusion of fly ash, silica fume, or slag in the binder, generally in an amount of from about 5% to about 20% by weight of the cementing material (i.e., on a dry basis, not including the water of the mixture).

Other modifications as are generally known in the art can be carried out in development of a high strength concrete incorporating the weathered granite coarse aggregate. For instance, the quantity of the coarse aggregate component should be the maximum consistent with workability. In addition, the coarse aggregate can be somewhat smaller than in lower strength concretes, for instance, from about 0.4 inches to about 0.5 inches in maximum cross-sectional dimension. The coarse aggregate component can also be clean and free of detrimental coatings (e.g., dust and loose clay).

Standard mixing times as are known in the art can be utilized in forming a concrete that includes a weathered granite coarse aggregate. However, mixing times can vary greatly, as is known, for instance from about five minutes to well over an hour, depending on local conditions, specific materials, concrete type and so forth. Following mixing and lying of the cement, the materials can set according to standard processes.

The high compressive strength/low elastic modulus concrete can be used in one embodiment in forming a high-aspect ratio structure. A high-aspect ratio structure is one in which the ratio of a first dimension (e.g., a length) to a cross sectional dimension (e.g., a width or a diameter of a cylinder) is greater than 1. For instance, the aspect ratio can be greater than 2, greater than 5, or greater than 10 in some embodiments.

In one particular embodiment, a high-aspect ratio structure as can be formed form the concrete can be a component of a railroad infrastructure, for instance a railroad tie or a concrete slab. A typical concrete railroad tie turnout assembly as may include a concrete railroad tie is shown in FIG. 1. As shown, the assembly includes a rail seat area 26 where a rail 28 can be fastened to a concrete railroad tie 30. In general, either cast-in shoulder inserts 31, 32 are provided opposing each other on field and gauge sides of the rail seat area 26, respectively or bolted steel plates (not shown) with attached fastenings are provided. The cast-in shoulder inserts 31, 32 can be permanently mounted within the concrete railroad tie 30 at a position directly adjacent to the rail 28. An insulator spacer 36 can be placed adjacent to and abutting the base or toe 38 of the rail 28 between the rail 28 and the shoulder insert 31, 32 with a 40 beneath the rail 28. A retaining clip 42 can be attached to a shoulder insert 31, 32 by way of inserting through a longitudinal receiving hole 44 in a shoulder insert 31, 32, pressing upon the outer surface of the corresponding insulator spacer 36 to rigidly secure rail 28 to the concrete railroad tie 30.

The present disclosure may be better understood by reference to the Examples, below.

Example 1

Coarse aggregates were acquired from four different sources. The first aggregate source, designated as CA1, was a limestone that is used by a major tie manufacturer. The concrete produced with the CA1 aggregates was consistent with AREMA requirements and served as the baseline for the high-strength reduced modulus-high-performance concrete (HSRM-HPC) characterization. The other three aggregate types were weathered granites and were designated as CA2, CA3 and CA4. The voids, density and relative density of all four coarse aggregate types were determined experimentally and were found to be the same for all practical purposes. Los Angeles (LA) abrasion tests showed that the CA1 limestone had higher resistance than the weathered granites CA2, CA3 and CA4. Aggregate CA4 exhibited the highest percentage loss.

All other materials in the mixtures, including fine aggregates and cement, were identical to one another and as provided by a concrete tie manufacturer. Each of the coarse aggregates, CA1-CA4 was used in the mixture design resulting to four different mixtures. Three concrete batches for each of the four mixtures was produced and for each batch the following material properties were determined per ASTM standards: (i) slump (ASTM C143/C143M), (ii) air content (ASTM C231/C231M), (iii) density (ASTM C138/C138M), (iv) cement content (ASTM D806), (v) yield (ASTM C138/C138M), (vi) compressive strength (ASTM C39/C39M), (vii) tensile strength (ASTM C1583/C1583M), (viii) elastic modulus (ASTM C469/C469M), and (ix) abrasion resistance (ASTM C779/C779M) of concrete.

Figure 2:
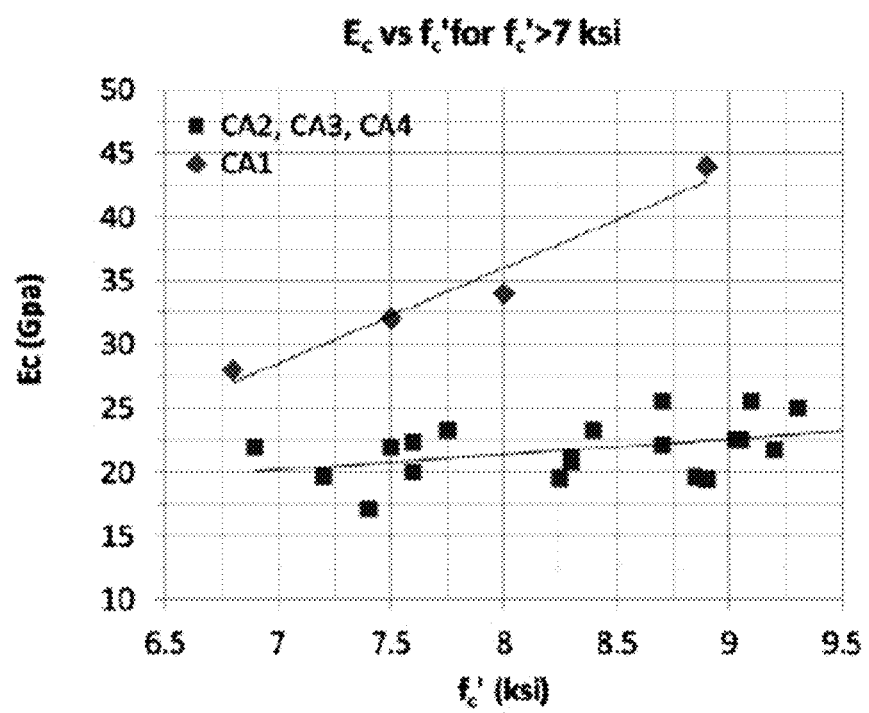
FIG. 2 graphically illustrates correlations of the modulus of elasticity with compressive strength of various concretes including a comparison concrete formed with a limestone aggregate (CA1) and exemplary concretes as disclosed herein formed with weathered granite aggregates (CA2, CA3, CA4).

It was observed that all batches of all mixtures produced concretes of very similar properties except for the modulus of elasticity and the abrasion resistance. FIG. 2 shows the modulus of elasticity of the concrete as a function of the compressive strength for all batches that exhibit strength greater than 7 ksi as measured at different specimen age. As can be seen, the CA1 limestone aggregate displays a strong correlation. However, for the weathered granites there is a weak correlation that is considered insignificant for all practical purposes.

In particular, using the mixture with CA1 aggregates as the baseline, it was determined that the mixtures with weathered granites produced concretes for which:

i) The elastic modulus was 37% to 50% less than the baseline ii) The resistance to abrasion as determined from lapping tests was superior compared to the baseline.

iii) The fresh concrete properties were very similar for all concrete mixes.

iv) The aggregate source did not alter the compressive and flexural strength of produced concretes;

Example 2

Figure 3A:
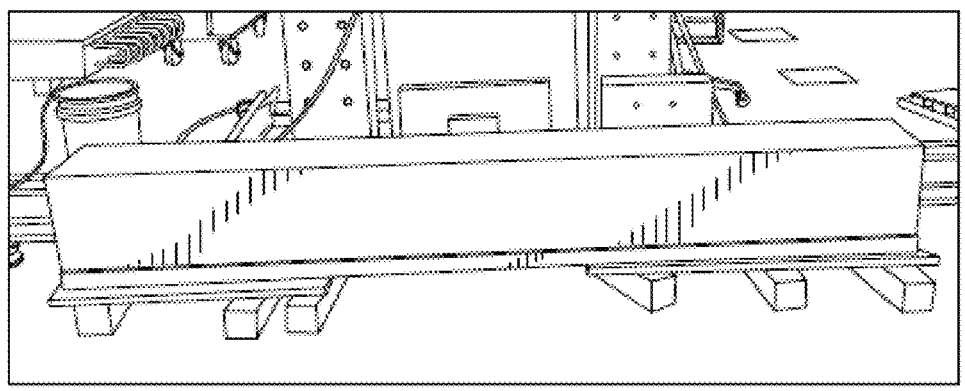
FIG. 3A illustrates a prismatic beam formulated in a laboratory environment from a concrete that incorporates a weathered granite aggregate as described herein.

A prestressed prismatic beam was fabricated in a laboratory environment using CA3 as described above in Example 1 as the coarse aggregate. Pre-stressing was applied through four low relaxation strands. The dimensions of the beam were 11 in×11 in×8 ft and the size and design of the beam was consistent with the tie design provided by the manufacturer. The beam is illustrated in FIG. 3A.

Figure 3B:
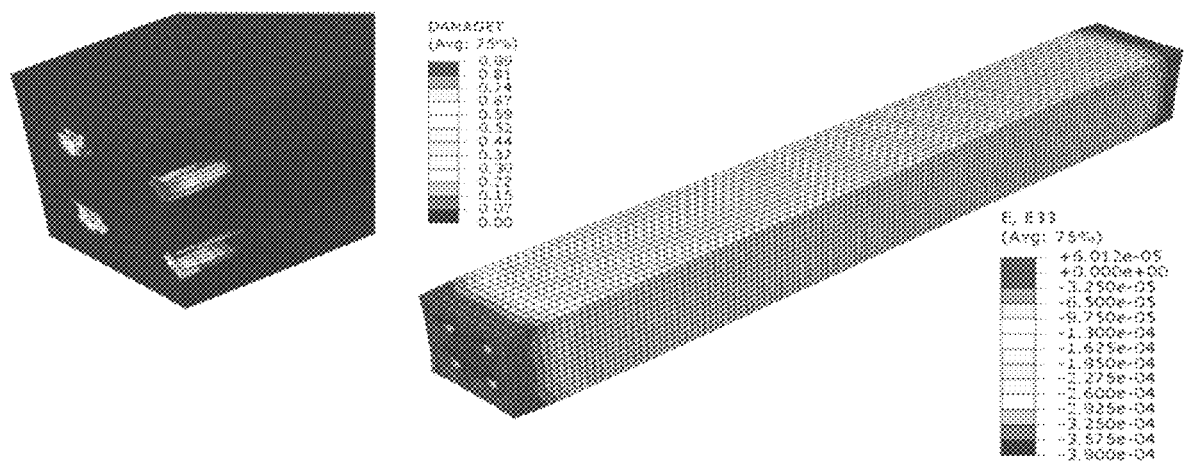
FIG. 3B illustrates a model of the prismatic beam of FIG. 3A for Finite Element Analysis in ABAQUS.
Figure 3C:
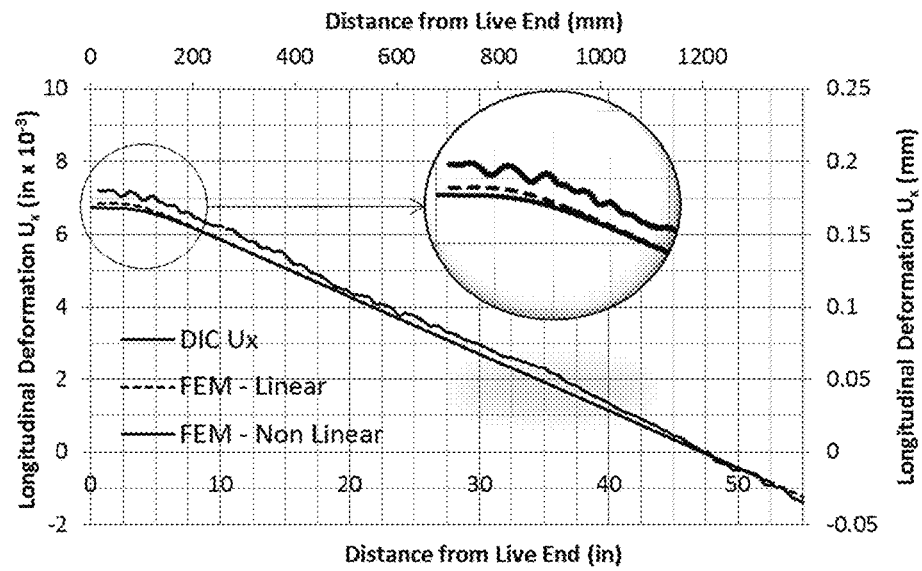
FIG. 3C presents the average longitudinal displacement recorded at the top surface of the beam of FIG. 3A along its length as obtained from Digital Image Correlation (DIC) and Finite Element Modeling (FEM).
Figure 3D:
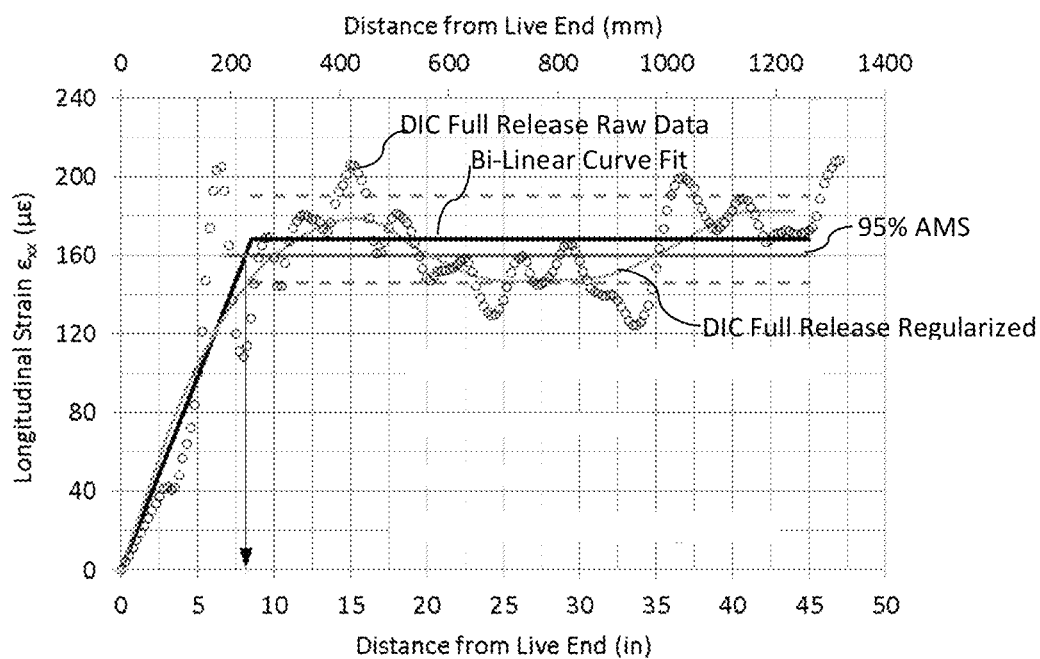
FIG. 3D presents the average longitudinal strain recorded at the top surface of the beam of FIG. 3A along its length as obtained from DIC and FEM.

The strands were instrumented with strain gauges and the 3-D strain field on the surface of the beam after strand release was determined through a Digital Image Correlation (DIC) technique. The prismatic beam was also modeled for Finite Element Analysis in ABAQUS (FIG. 3B) where the strand-concrete interface was represented by appropriate contact elements. In FIG. 3C is shown the average longitudinal displacement and in FIG. 3D is shown the average longitudinal strain recorded at the top surface of the beam along its length as obtained from the DIC measurements and the FEM models. The transfer length was estimated—in the range 7 in to 8 in and was consistent with the range of values predicted by classical and analytical models.

Example 3

In order to assess the performance of the HSRM-HPC ties, a prototype tie was designed and 32 prototype ties were fabricated at a tie manufacturer facility using the CA3 coarse aggregate as described above in Example 1. The pre-stressing was applied through 8 low relaxation strands with a ⅜-inch diameter, placed in two layers. The strength requirements were a minimum compressive strength of 4 ksi at strand release and a minimum of 7 ksi compressive strength at 28 days. During the fabrication of the prototype ties, baseline ties using aggregate CA1 were also fabricated.

Figure 4A:
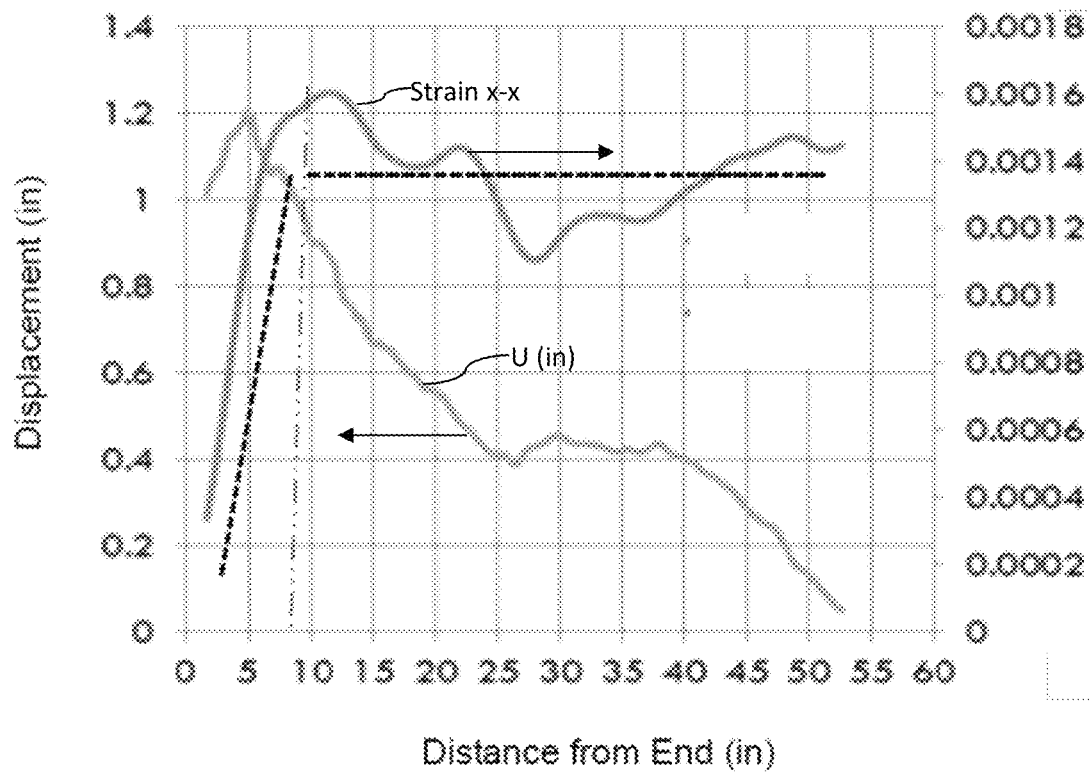
FIG. 4A illustrates transfer length estimates for displacement and strain in concrete ties formed with a concrete as described herein.
Figure 4B:
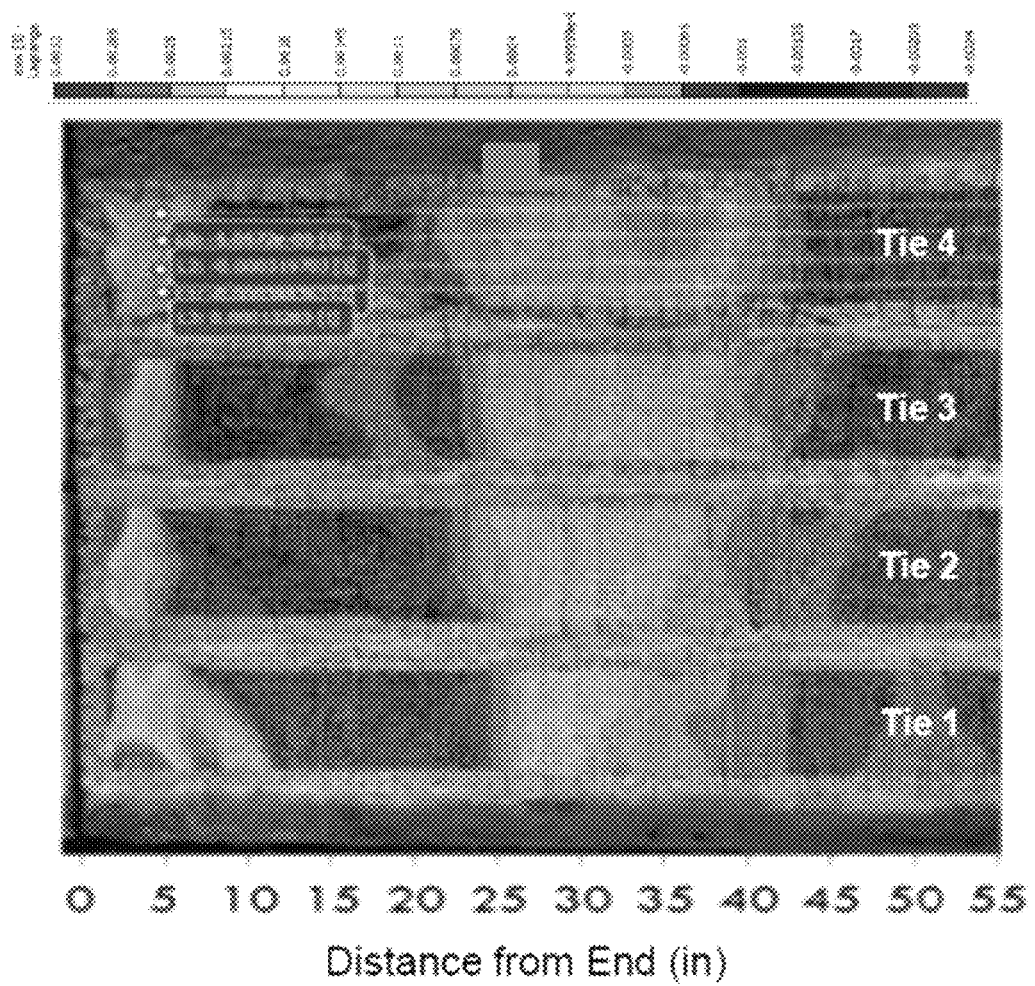
FIG. 4B illustrates the longitudinal strain field in different concrete ties formed with a concrete as described herein.

Transfer length measurements were obtained through DIC measurements of the 3-D strain field on the exposed bottom surface of the tie while still in the forms. Measurements (FIG. 4A) and images (FIG. 4B) showed that the transfer length was in the range of 8-11 inches for the prototype ties and in the range of 10-13 inches for the conventional ties. The reduced transfer length is a desired effect.

The prototype and conventional ties were qualified following the test procedures set forth in the AREMA Manual for Railway Engineering, Chapter 30—Ties, Part 4.9.1.1 a-f, and 4.9.1.2 a,b. All prototype and conventional ties passed successfully all qualification tests. However, one of the conventional ties marginally passed the "Rail Seat A" positive loading test, since a crack was detected right at the design load.

Figure 5:
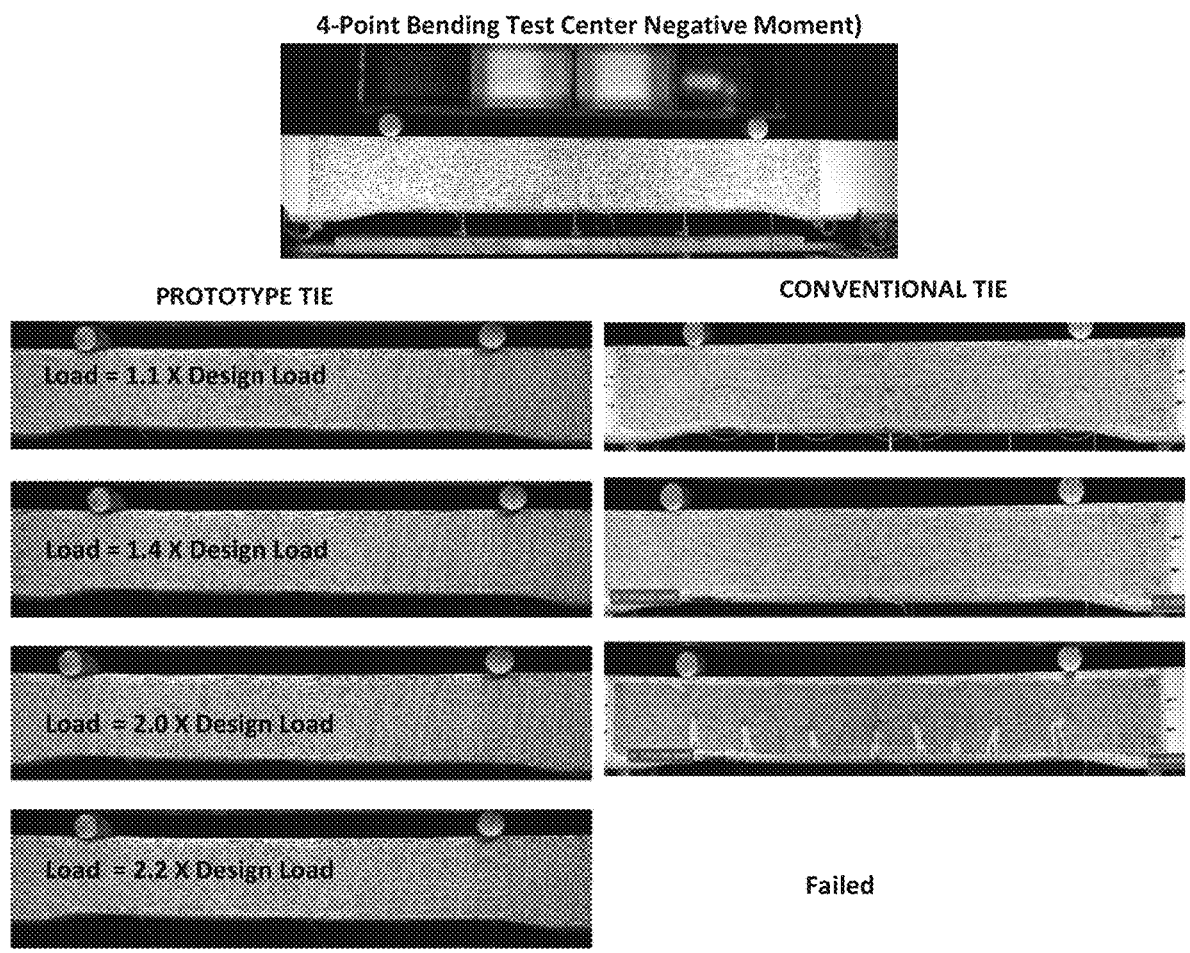
FIG. 5 compares the evolution of damage in a prototype tie with that of a conventional tie when loaded to failure. The images showing cracking initiating at a higher load in the prototype tie compared to the conventional tie. The prototype tie failed under a higher ultimate load compared to the conventional tie.

The prototype and standard ties were also tested to failure for load cases related to rail seat and center moment capacity and the evolution of damage was monitored. FIG. 5 shows the evolution of damage due to center negative moments. Cracking initiated at the design load in the conventional tie. Initiation of cracking was delayed in the prototype tie. In addition, the failure load in the prototype tie was 15% higher than the failure load of the conventional tie.

Example 4

Figure 6:
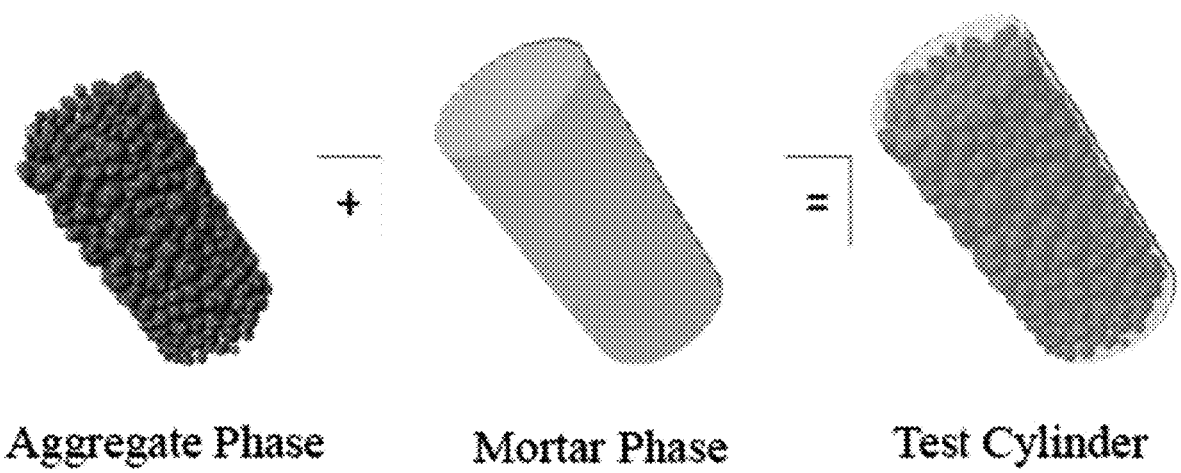
FIG. 6 illustrates model components developed for finite element modeling (FEM) of concrete cylinders for simulation of compressive strength and elastic modulus testing.

Compressive stress and elastic modulus tests were simulated through computer modeling. To this end, a two-phase model was developed where each phase was assigned material properties as obtained from laboratory testing. As illustrated in FIG. 6, the first phase was the coarse aggregates and the second phase was the mortar matrix. Modeling of the mortar was straightforward. The aggregate phase was modeled as a group of spheres with diameters that were consistent with the distribution of the aggregate particle size as obtained from sieve analyses of the coarse aggregate. The spheres were packed in the volume of the test cylinder in a manner to produce the void measured experimentally. The two phases were coupled at their interface to form the concrete cylinder model, as shown in FIG. 6. By assigning anisotropic material properties in the aggregates the weathering effects were explicitly accounted for. Verification of these models showed good agreement with experimental values for estimating the modulus of elasticity.

Figure 7:
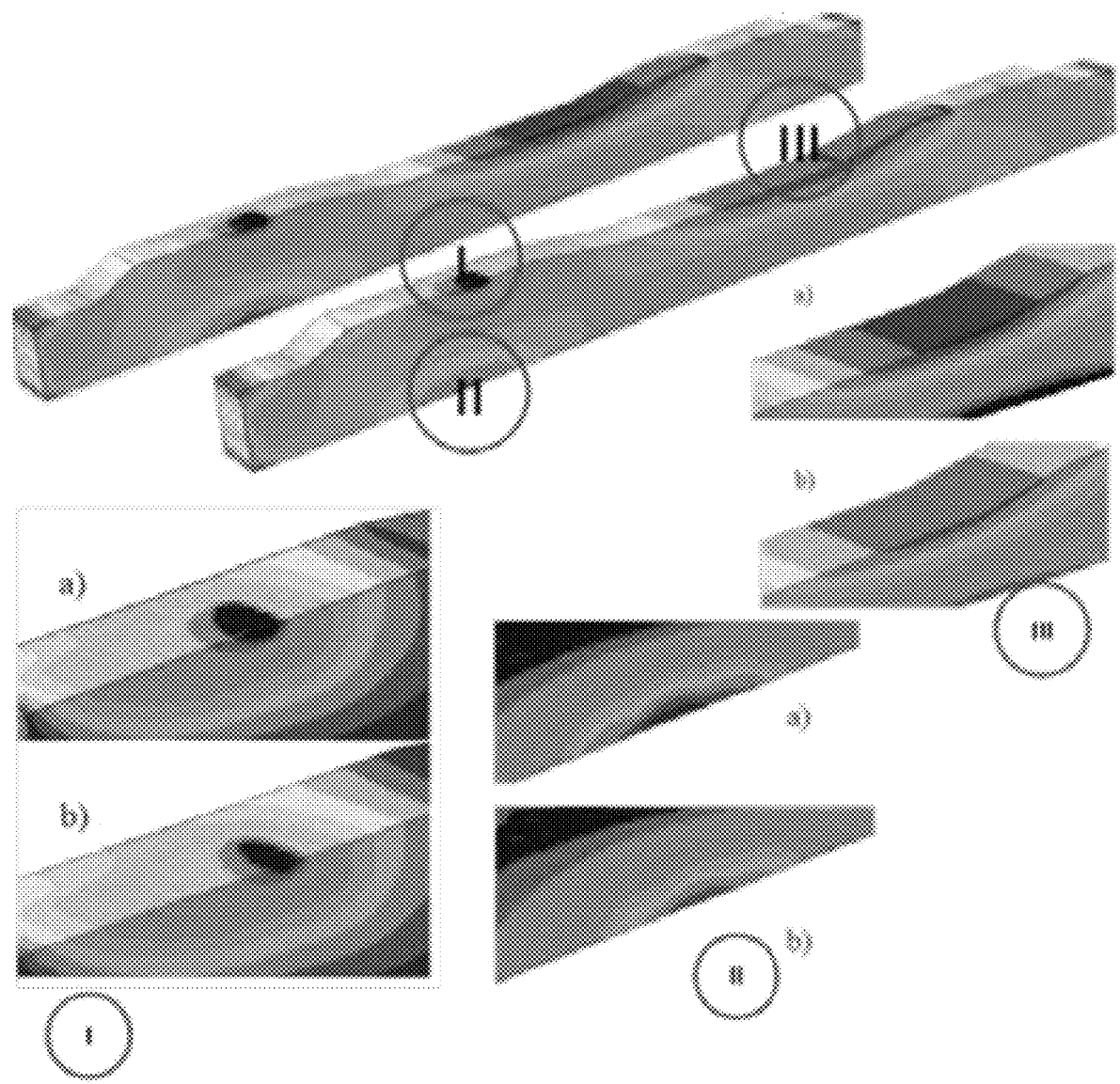
FIG. 7 illustrates the results of a stress field assessment carried out through computer simulations of a tie formed of concrete as described herein.

Detailed models of the conventional (baseline) and the prototype tie were developed for Finite Element Analysis using ABAQUS. The support conditions were explicitly accounted for through modeling of the ballast. An average modulus of elasticity of 40 GPa was assumed for the baseline tie and 20 GPa was assumed for the prototype tie, representing a 50% reduction in the elastic modulus. The stress field was computed in each case and three critical areas were monitored, i.e., (I) the rail seat, (II) bottom of tie under the rail seat and (III) the mid-section at negative moment. Typical stress field results are shown in FIG. 7. It was observed that the more flexible HSRM-HPC tie exhibited smoother load distribution as compared to the baseline ties. In addition, as shown below in Table 1, a stress amplitude reduction as high as 50% was recorded in critical areas II and III and regularized stress field gradients were observed in the HSRM-HPC models.

TABLE 1

| Location | Stress Reduction Due To HSRM-HPC |
|---|---|
| I | 15% |
| II | 50% |
| III | 48% |

These and other modifications and variations to the present disclosure may be practiced by those of ordinary skill in the art, without departing from the spirit and scope of the present disclosure, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the disclosure so further described in such appended claims.

What is claimed is:

1. A structure having an aspect ratio of greater than 1, the structure comprising concrete having a compressive strength of 7 ksi or greater as determined according to ASTM C 39 (AASHTO T 22) and an elastic modulus of 4,300 ksi or less as determined according to ASTM C 469, the concrete comprising a coarse aggregate, the coarse aggregate comprising weathered granite aggregate having a cross sectional dimension of 0.19 inches or greater.

2. The structure of claim 1, having an aspect ratio of 5 or greater.

3. The structure of claim 1, wherein the structure is a rail infrastructure component.

4. The structure of claim 1, wherein the structure is a railroad tie.

5. The structure of claim 1, wherein the concrete of the structure is a high strength concrete or a high early strength concrete.

6. The structure of claim 1, wherein the weathered granite aggregate has a cross sectional dimension of 0.4 inches to 1.5 inches.

7. The structure of claim 1, the concrete having an elastic modulus of 2,600 ksi or less.

8. The structure of claim 1, the concrete having a compressive strength of 8.5 ksi or greater and an elastic modulus of 2,900 ksi or less.

9. A method for forming the structure of claim 1 comprising forming the concrete according to a process that includes mixing water with dry materials to form a mixture, the dry materials including the coarse course aggregate, a fine aggregate, and a binder.

10. The method of claim 9, the mixture including the water and the dry materials in a weight ratio of from 0.2 to 0.8.

11. The method of claim 9, the mixture including the coarse aggregate in an amount of from 1700 pounds per cubic yard to 2000 pounds per cubic yard.

12. The method of claim 9, the mixture including the fine aggregate in an amount of from 1120 pounds per cubic yard to 1200 pounds per cubic yard.

13. The method of claim 9, the binder comprising two or more of a cement, fly ash, slag, and silica fume.

14. The method of claim 9, the mixture including the binder in an amount of from 500 pounds per cubic yard to 1000 pounds per cubic yard.

15. The method of claim 9, the binder comprising a Type III cement.

16. The method of claim 9, wherein the mixing is carried out at a temperature up to 60° C.

* * * * *